US008291122B2

(12) United States Patent
Radtke

(10) Patent No.: US 8,291,122 B2
(45) Date of Patent: Oct. 16, 2012

(54) METHODS AND SYSTEMS FOR UNINTERRUPTED MEDIA CHANGE

(75) Inventor: Kenneth A. Radtke, Seattle, WA (US)

(73) Assignee: Nvidia Corporation, Santa Clara, CA (US)

( * ) Notice: Subject to any disclaimer, the term of this patent is extended or adjusted under 35 U.S.C. 154(b) by 515 days.

(21) Appl. No.: 11/424,841

(22) Filed: Jun. 16, 2006

(65) Prior Publication Data

US 2007/0294176 A1  Dec. 20, 2007

(51) Int. Cl.
*G06F 15/16* (2006.01)
(52) U.S. Cl. ........................................ 709/250; 709/231
(58) Field of Classification Search ................ 386/3, 35, 386/97, 120; 715/723; 725/38, 52, 59, 94, 725/120; 709/231, 250
See application file for complete search history.

(56) References Cited

U.S. PATENT DOCUMENTS

| 5,825,970 | A | * | 10/1998 | Kim, II | 386/109 |
| 6,614,990 | B1 | * | 9/2003 | Nishida et al. | 386/125 |
| 6,985,188 | B1 | | 1/2006 | Hurst, Jr. | |
| 7,240,358 | B2 | * | 7/2007 | Horn et al. | 725/87 |
| 2002/0107968 | A1 | | 8/2002 | Horn et al. | |
| 2003/0202776 | A1 | * | 10/2003 | Kendall et al. | 386/94 |
| 2004/0221311 | A1 | * | 11/2004 | Dow et al. | 725/52 |
| 2006/0282319 | A1 | * | 12/2006 | Maggio | 705/14 |

FOREIGN PATENT DOCUMENTS

| CN | 1298259 | 6/2001 |
| CN | 101090490 | 12/2007 |
| WO | 2005011270 | 2/2005 |

* cited by examiner

*Primary Examiner* — Peling Shaw

(57) ABSTRACT

Uninterrupted Media Change (UMC) is a solution for changing between input channels such that complete segments of content are observed in the output channel. UMC provides for seamless switching between concurrent, multi-segment, media data streams. Media data streams are input channels composed of discrete segments of information, which may include audio, images or video content. Segments are defined by points that mark the beginning and end of content within the input data stream. When a UMC event is selected by a user, the next segment beginning for the target input channel is detected and that target segment is buffered until the end of the current active segment is reached, at which point the buffered target segment is made the new active segment and presented to the user from its buffered beginning.

25 Claims, 6 Drawing Sheets

METHODS AND SYSTEMS FOR UNINTERRUPTED MEDIA CHANGE

BACKGROUND

1. Field of the Application

Generally, this application relates to the media data streams. More specifically, it relates to methods and systems for uninterrupted change between segments of multiple media data streams.

2. Description of the Related Art

In today's world of ready-access to a variety of streaming media, multiple media data streams, or input channels, can be simultaneously presented to a user. These multiple media data streams can include, for example, multiple stations of a satellite radio system, multiple channels of a cable TV system, multiple choices of an Internet audio/video system, and the like. Each media data stream can be considered as being made up of a series of media segments, such as songs, music videos, webcasts, sitcom episodes, advertisements, and so on. The user can then select a particular media data stream to make active, e.g., to view, for image media, to hear, for audio media, or both, for video media. Typically, switching between input channels abruptly interrupts the active segment on the active channel at a point other than its beginning or end and initiates a new segment on the new active input channel, or target input channel, at a point somewhere in its middle, which results in two incomplete segments being presented to the user.

As a common example of this abrupt interruption when switching between input channels, consider what happens when a person "channel-surfs" using a TV remote control. As the channels are changed, the current segment being viewed on the active TV channel is abruptly halted (i.e., at a place other than its beginning or end) and a new segment is displayed on the new active TV channel, typically at a place other than its beginning or end. So the person flipping between TV stations cannot view, from start to finish, either program from the old or new TV channel. Another common example of this abrupt interruption is changing radio stations, i.e., "button-pushing" on a car stereo.

Therefore, what is needed are methods and systems to facilitate a user's ability to change between segments of multiple media data streams without interrupting the particular segment being presented on the media data stream that the user desires to leave (i.e., the segment being presented immediately prior to the user's change request), while presenting to the user a complete, new segment on the new media data stream to which the user desires to go.

SUMMARY

Uninterrupted Media Change (UMC) is a solution for changing between input channels such that complete segments of content are observed in the output channel. UMC provides for seamless switching between concurrent, multi-segment, media data streams and is intended to used by itself, or in combination with other functions, on/in any type of segmented multimedia device (e.g., radios, televisions, computers, music/video players, personal digital assistants, telephones, other audio/video devices, and the like). Media data streams are input channels composed of discrete segments of information, which may include audio, images or video content. Segments are defined by points that mark the beginning and end of content within the input data stream. When a UMC event is selected by a user, the next segment beginning for the target input channel is detected and that target segment is buffered until the end of the current active segment is reached, at which point the buffered target segment is made the new active segment and presented to the user from its buffered beginning.

The application presents a method for uninterrupted media change (UMC) between segments on separate input channels, the method comprising: presenting an active segment from an active input channel of a plurality of input channels to a user; receiving a UMC request to a target input channel of the plurality of input channels from the user; making the target input channel a new active input channel and a target segment from the target input channel a new active segment; and presenting the entire new active segment to the user.

The application presents a system for uninterrupted media change (UMC) between segments on separate input channels, comprising: a plurality of input channels, including an active input channel and a target input channel; a primary buffer coupled to the active input channel; a secondary buffer coupled to the target input channel; an output channel selectively coupled to the primary buffer and the secondary buffer; and a control unit operably coupled to plurality of channels, the primary channel and the secondary channel.

BRIEF DESCRIPTION OF THE DRAWINGS

Aspects and features of this application will become apparent to those ordinarily skilled in the art from the following detailed description of certain embodiments in conjunction with the accompanying drawings, wherein.

DETAILED DESCRIPTION

Embodiments will now be described in detail with reference to the drawings, which are provided as illustrative examples of certain embodiments so as to enable those skilled in the art to practice the embodiments, and are not meant to limit the scope of the application in any way. Where aspects of certain embodiments can be partially or fully implemented using known components or steps, only those portions of such known components or steps that are necessary for an understanding of the embodiments will be described, and detailed description of other portions of such known components or steps will be omitted so as not to obscure the understanding of the embodiments. Further, certain embodiments are intended to encompass presently known and future equivalents to the components referred to herein by way of illustration.

Uninterrupted media change (UMC), as certain embodiments will be referenced, facilitates changing between input channels such that complete segments of content are presented to the output channel. UMC is capable of seamlessly switching between multiple input channels, where each input channel includes multiple segments. As used herein, input channels are media data streams that are composed of segments of information, which may include data, text, audio, images, video or a combination thereof. Segments are variably-sized information content and are defined by points that mark the beginning and end of each discrete element of information within the input data stream, i.e., the beginning-of-segment (BOS) and the end-of-segment (EOS), respectively. For example, a segment might be one song within a music input channel, or one news story within a webcast input channel. Those skilled in the art will recognize and appreciate the quantity and variety of segments and media data streams, all of which are intended to be within the scope of the present application. For the description of certain embodiments, below, multiple input channels, each comprising segmented information, are presumed to exist concurrently and be available for selection by a user.

Figure 1:
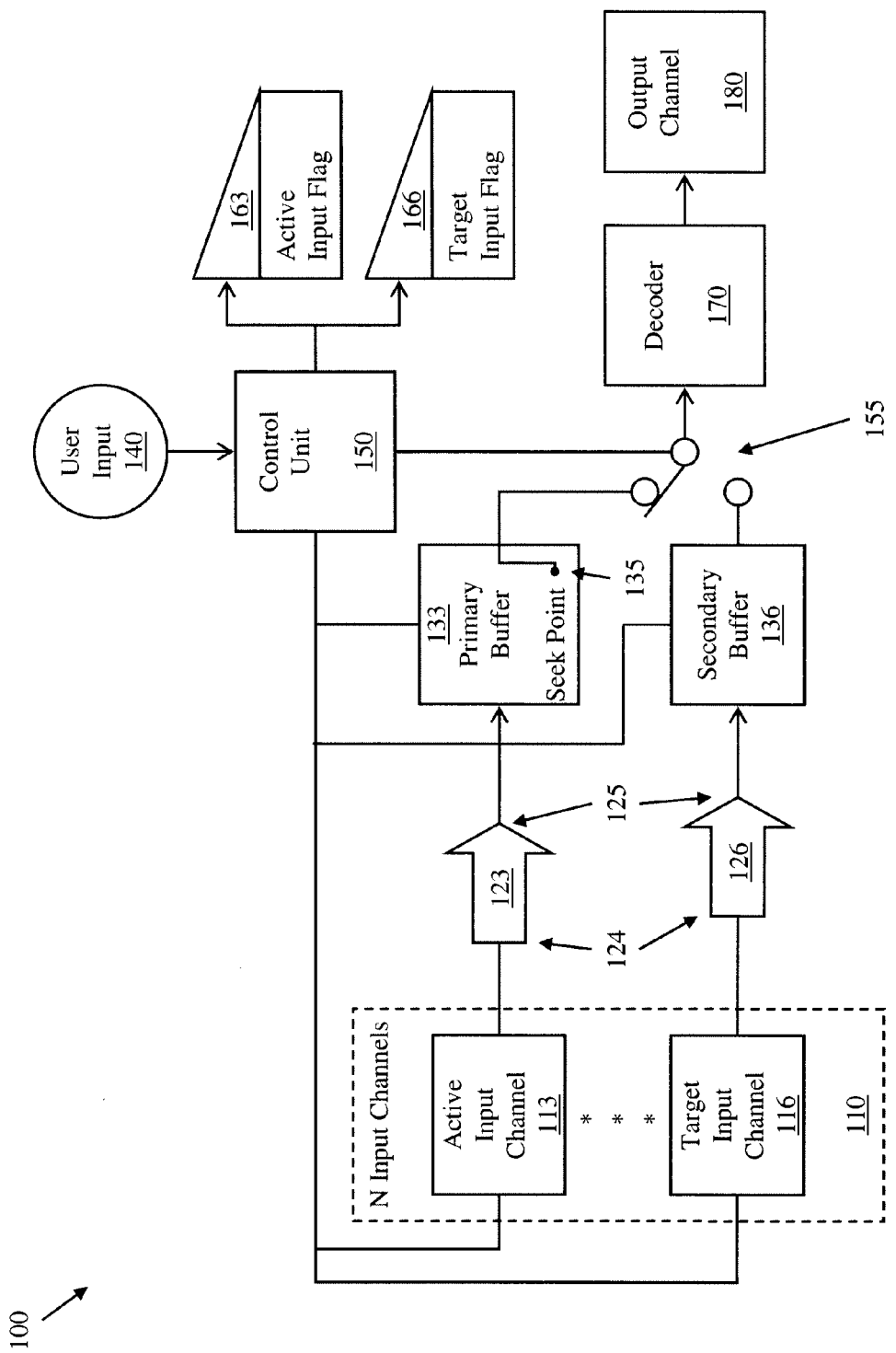
FIG. 1 illustrates an exemplary block diagram of a UMC system capable of operation according to certain embodiments.

FIG. 1 illustrates an exemplary block diagram of a UMC system 100 capable of operation according to certain embodiments. As shown in FIG. 1, system 100 includes N input channels 110. N input channels 110 can include at least an active input channel 113 and a target input channel 116, for a total of N input channels, where N is some integer greater than one. For certain embodiments, active input channel 113 is the currently selected input channel whose content is being presented to a user via an output channel 180, and target input channel 116 is any of the remaining N input channels 110, which is different than active input channel 113, that has been requested for presentation by the user. For certain embodiments, output channel 180 is the means for delivering content (e.g., decoded segments) to the user. As necessary, a decoder 170 may be used to transform, for example, encoded digital segments to data required for proper content delivery by output channel 180. Output channel 180 can similarly perform other functions (not shown) such as will be apparent to those skilled in the art upon review of the teachings herein (e.g., decryption, encryption, scaling, and the like). A seek point 135 can be used to indicate from where decoder 170 (or output channel 180) is to receive segments.

In certain embodiments, active input channel 113 provides one or more segments 123 to a primary buffer 133, which can be any type of memory capable of storing segments 123 and providing them to a decoder 170 as directed by a control unit 150. Similarly, target input channel 116 provides one or more segments 126 to a secondary buffer 136, which can be any type of memory capable of storing segments 126 and providing them to decoder 170 as directed by control unit 150. Segments 123, 126, as previously discussed, can each be defined by a beginning-of-segment (BOS) point 125 and an end-of-segment (EOS) point 124. Note that primary and secondary buffers 133, 136 need not be physically distinct, but may be one memory utilized for two purposes (e.g., via queues that might keep track of which memory locations are being used for which purpose). For certain embodiments, control unit 150 is the means for directing action (as described in further detail, below, with or without any user input 140) within UMC system 100. Control unit 150, in directing action within UMC system 100, can utilize an active input flag 163 and a target input flag 166. In certain embodiments, active input flag 163 indicates whether an active input channel currently exists and target input flag 166 indicates whether a target input channel has been selected by the user (i.e., the user has to provide input to the system that a new input channel is desired as the active input channel).

Figure 2A:
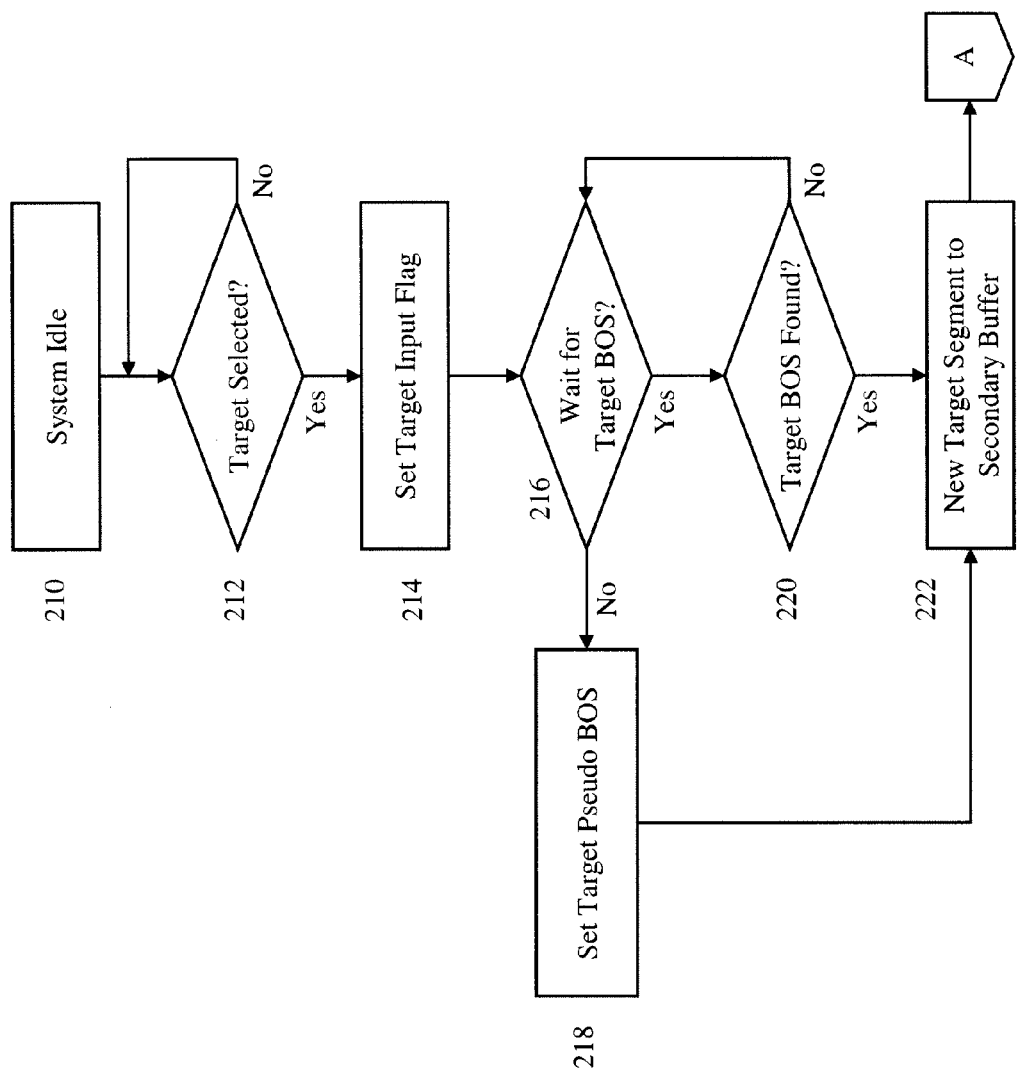
FIGS. 2A-2C illustrate an exemplary operational flow of the UMC system of FIG. 1 according to certain embodiments.
Figure 2B:
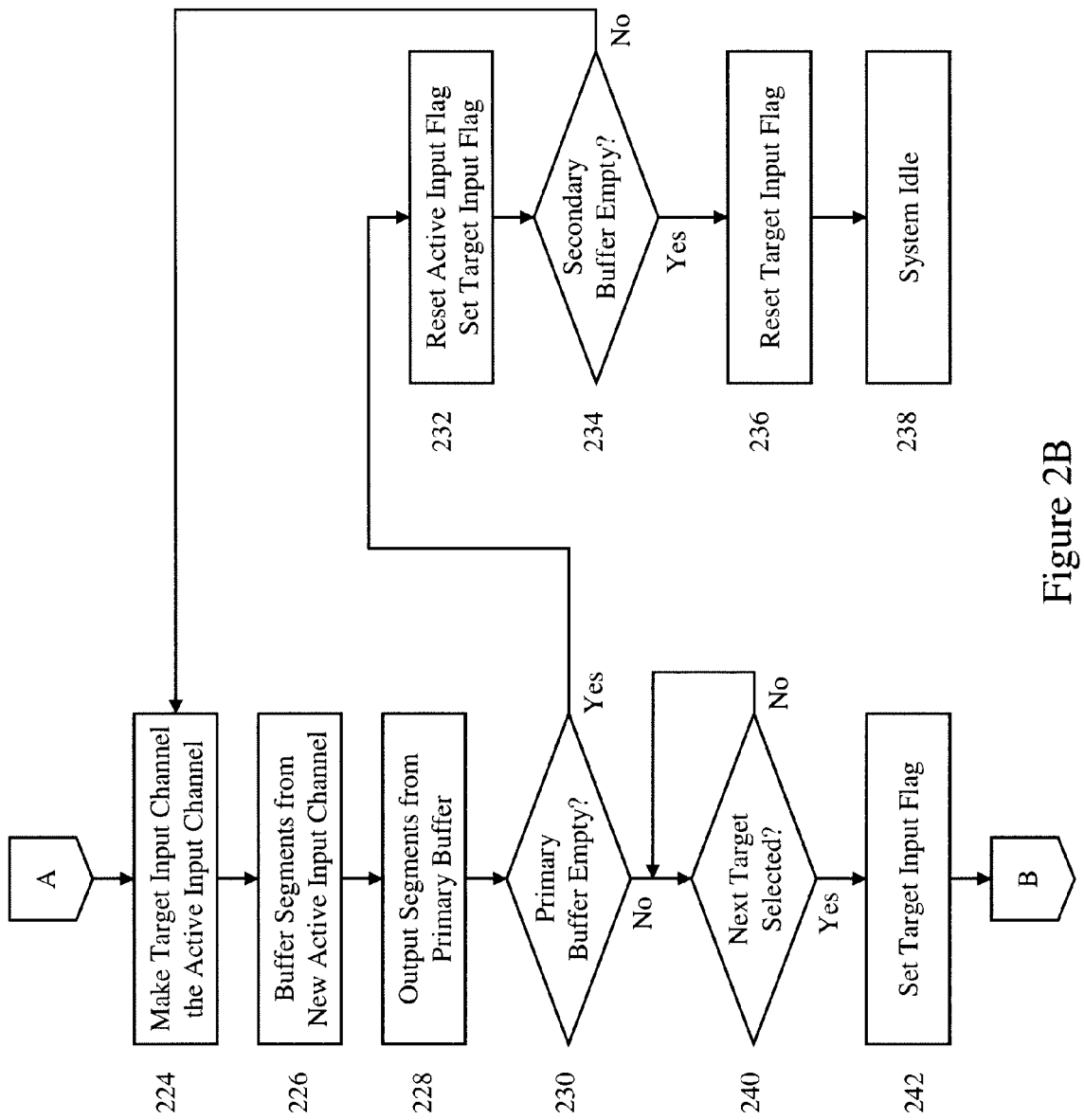
Figure 2C:
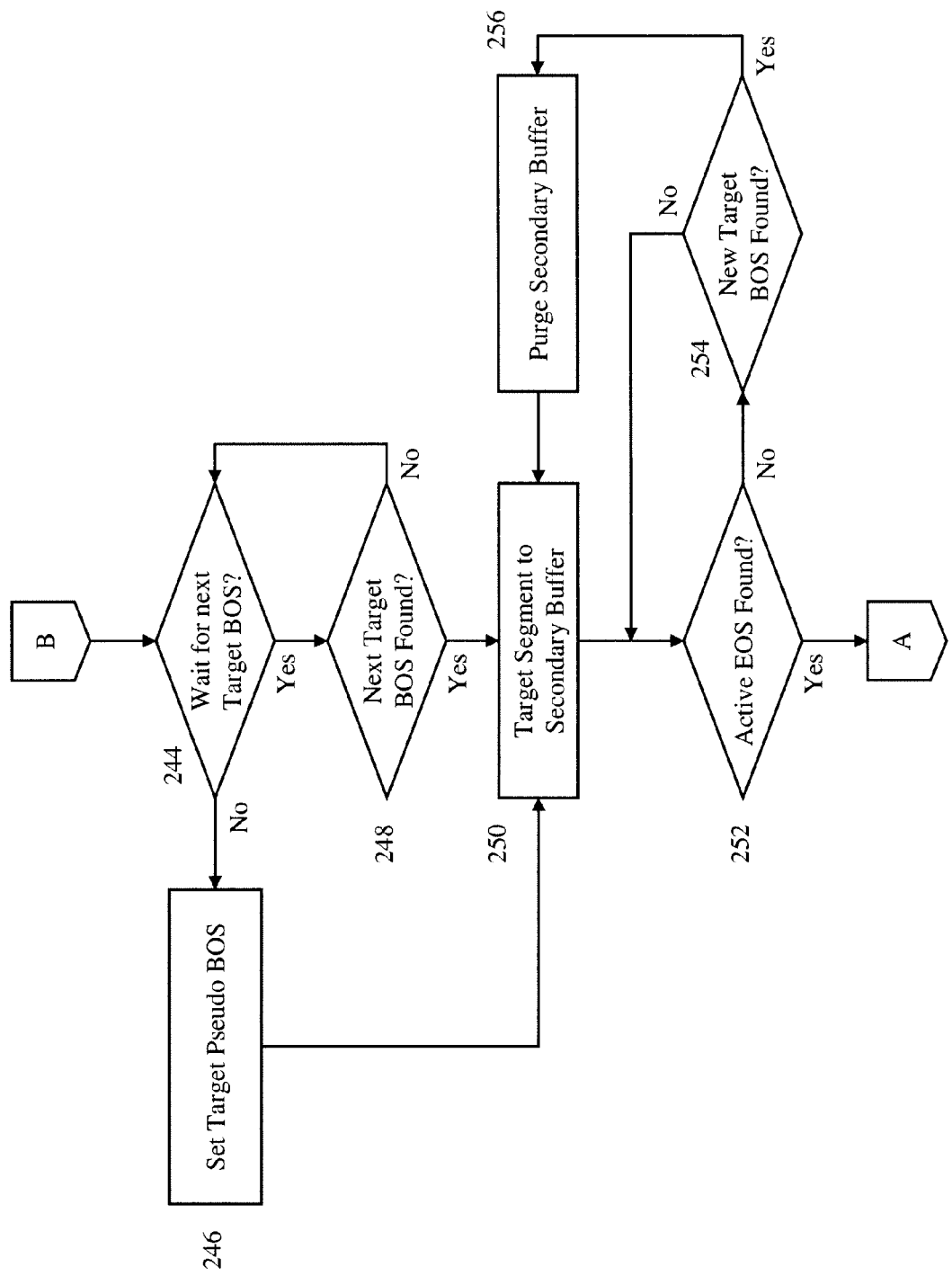

FIGS. 2A-2C illustrate an exemplary operational flow of UMC system 100 of FIG. 1 according to certain embodiments. As shown in FIG. 2A, this exemplary operational flow begins with UMC system 100 idle 210. In this state, there is no active input channel 113 selected and no active segments 123 in primary buffer 133. Additionally, there is no target input channel 116 selected and no target segments 126 in secondary buffer 136. Active input flag 163 and target input flag 166 are reset, indicating the lack of active and target input channels, respectively. Further, in system idle 210, output channel 180 is presenting nothing to the user, since the decoder takes its input from seek point 135 and there are no segments in the empty primary buffer 133. From the system idle 210 condition, operation is waiting for user input 140 to select an input channel as the new target input 212. Note that, while this disclosure uses the term "user" as if it were a person, the user might also be a hardware and/or software system, with or without human interaction, capable of providing the appropriate inputs.

In certain embodiments, when a new target input channel is selected 212 by the user, control unit 150 sets target input flag 166 and determines a BOS 125 for target segment 126 on target input channel 116. Control unit 150 can determine BOS 125 for target segment 126 in various ways. As shown in FIG. 2A, control unit 150 can simply wait for the BOS 125 indication 216, at which point, once BOS 125 for target segment 126 is found 220, the new target segment 126 can be sent to, and stored 222 in secondary buffer 136. However if BOS 125 for target segment 126 is not found 220, control unit 150 can continue to wait for it 216. If, after additional user input 140 or after a predetermined waiting period has expired, control unit 150 has not found BOS 125 for target segment 126, then control unit 150 can set a pseudo BOS 218 for target segment 126. In this regard, setting a pseudo BOS is simply setting BOS 125 to be any point within the current target segment being presented on target input channel 116, which may result in new target segment 126 starting somewhere other than its actual beginning (e.g., starting up mid-stream). After setting the target pseudo BOS 218, the new target segment 126 can be sent to, and stored 222 in secondary buffer 136.

As shown in FIGS. 2A-2B, system operation continues through connector A by making the target input channel the active input channel 224. This step can involve several actions. First, if applicable, control unit 150 stops buffering active segments 123 from active input channel 113 into primary buffer 133, and resets active input flag 163. Once active segment 123 EOS 124 is reached, target input channel 116 is reassigned to be active input channel 113 and secondary buffer 136 is swapped with primary buffer 133. This reassignment and swapping can be accomplished by a simple switching 155 between the buffers associated with the media streams, which can be either logical and/or physical switching. Additionally, or alternatively, the newly re-designated secondary buffer 136 (i.e., former primary buffer 133) may be purged of data. Target input flag 116 is reset and active input flag 163 is set. Control unit 150 then updates seek point 135 to be the appropriate BOS (as determined with reference to operations 216-222, above) of the segment (or portion thereof) stored in the newly reassigned primary buffer 133. Note that any of N input channels 110 can at some point in time go from target input channel 116 to active input channel 113, depending on appropriate user input 140 and further system operations. Likewise, the designations of primary buffer 133 and secondary buffer 136 are strictly naming conventions depending on system state relative to active input channel 113 and target input channel 116, respectively, and depending on active/target segment EOS and BOS.

As shown in FIG. 2B, as long as active input flag 163 is set, control unit 150 continually directs segments 226 from active input channel 113 to primary buffer 133. Further, buffered active segments are presented to the user 228 via output channel 180. These buffering and outputting operations continue throughout the remaining system operation until either active input channel 113 runs out of segments, and hence primary buffer 133 becomes empty, or the next target input channel is selected by the user and acted upon by further system operations. In the first situation, if primary buffer 133 becomes empty 230, control unit 150 resets active input flag and sets target input flag 232. Then, control unit 150 checks whether secondary buffer 136 is empty. If secondary buffer 136 is also empty 234, control unit 150 resets target input flag 166 and the system returns to its idle state 238. In the second situation, control unit 150 checks for user input 140 that selects the next target input channel 116, at which point target input flag 166 is set 242.

As shown in FIGS. 2B-2C, system operation continues through connector B, where control unit 150 determines a BOS 125 for next target segment 126 on target input channel 116. Control unit 150 can determine BOS 125 for next target segment 126 in various ways. As shown in FIG. 2C, control unit 150 can simply wait for the BOS 125 indication 244, at which point, once BOS 125 for next target segment 126 is found 248, the next target segment 126 can be sent to, and stored 250 in secondary buffer 136. However if BOS 125 for next target segment 126 is not found 248, control unit 150 can continue to wait for it 244. If, after additional user input 140 or after a predetermined waiting period has expired, control unit 150 has not found BOS 125 for next target segment 126, then control unit 150 can set a pseudo BOS 246 for next target segment 126. After setting the target pseudo BOS 246, the next target segment 126 can be sent to, and stored 250 in secondary buffer 136. After the next target segment 126 has begun being buffered using its found (or pseudo) BOS 125, control unit 150 waits for the next active segment 123 EOS 124 to been found 252. If it has been found, then system control passes back through connector A to FIG. 2B and the next target input channel is made into the new active input channel 224, as previously discussed.

However, as shown in FIG. 2C, if control unit 150 has not found 252 active segment 123 EOS 124, then control unit determines whether a new target BOS has been found 254. A new target BOS can be found by also determining whether the EOS for the target segment that is currently being buffered in secondary buffer 136 has been reached. Either way, if a new target segment comes before the active EOS is found 254, then the completed target segment in secondary buffer 136 can be purged 256 to make room for the new target segment. Alternatively, this purging of complete target segments can happen only when secondary buffer becomes full, or nearly full. Once the secondary buffer has been purged of the complete target segment, then the new target segment can be buffered 250, and the wait for active segment EOS 252 can continue. If no new target segment is found 254, then the wait for active segment EOS 252 can continue.

Figure 3:
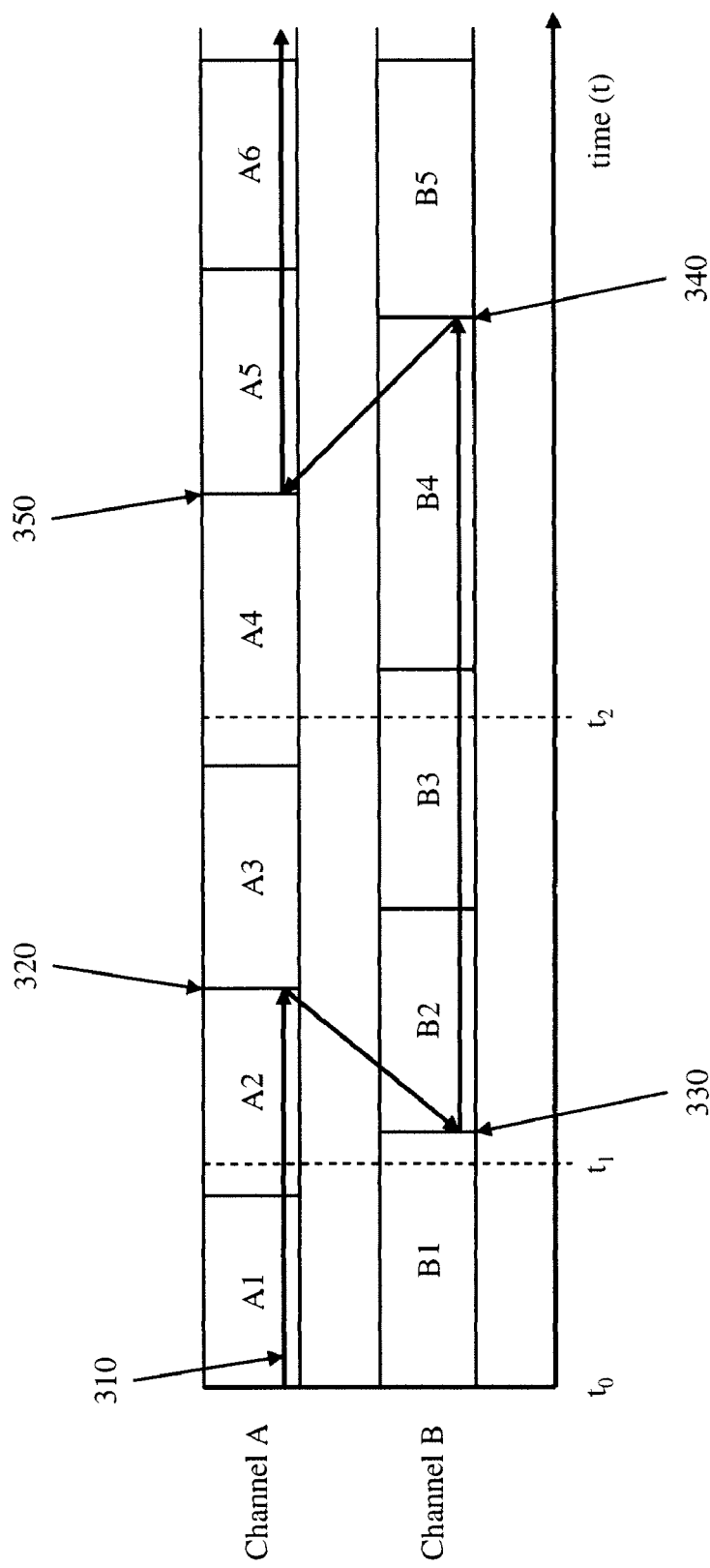
FIG. 3 illustrates a simple, two stream operation for an exemplary UMC system implementation according to certain embodiments.

As described above, in relation to certain embodiments, a transition from the active Input Channel to the target input channel occurs only after first detecting a BOS on the target input channel, and then detecting an EOS on the active input channel. This might cause the active input channel to play more than one segment before switching to the target input channel. FIG. 3 illustrates a simple, two stream operation for an exemplary UMC system implementation according to certain embodiments. As shown in FIG. 3, Channel A and Channel B are each comprised of multiple segments: A1-A6 and B1-B5, respectively. At time $t_0$, the active input channel 310 is Channel A. At time $t_1$, a user initiates a UMC event to Channel B while being presented segment A2 from Channel A. As previously discussed in relation to FIGS. 2A-2C, the system waits for the next BOS for the target input channel, Channel B, which in this example is the BOS for segment B2 330. Once the BOS for B2 330 is found and segment B2 has begun being buffered in the secondary buffer, the system waits for the EOS of active segment A2 320. When the EOS of active segment A2 320 is reached, Channel B is made the active input channel and the system presents segment B2, beginning at its BOS 330, as the new active segment from the new active input channel, i.e., Channel B.

At time $t_2$, a user initiates a UMC event back to Channel A while playing active segment B3 from the current active input channel, Channel B. Like before, the system waits for the next BOS for the target input channel, Channel A, which in this example is the BOS for segment A5 350. Note that during the wait for the BOS for the next target segment, the active input channel completed the active segment that was being presented when the UMC event happened, segment B3, and started on a new active segment, B4. Once the BOS for A5 350 is found and segment A5 has begun being buffered in the secondary buffer, the system waits for the EOS of the current active segment B4 340. When the EOS of the current active segment B4 350 is reached, Channel A is made the active input channel and the system presents segment A5, beginning at its BOS 350, as the new active segment from the new active input Channel A.

Figure 4:
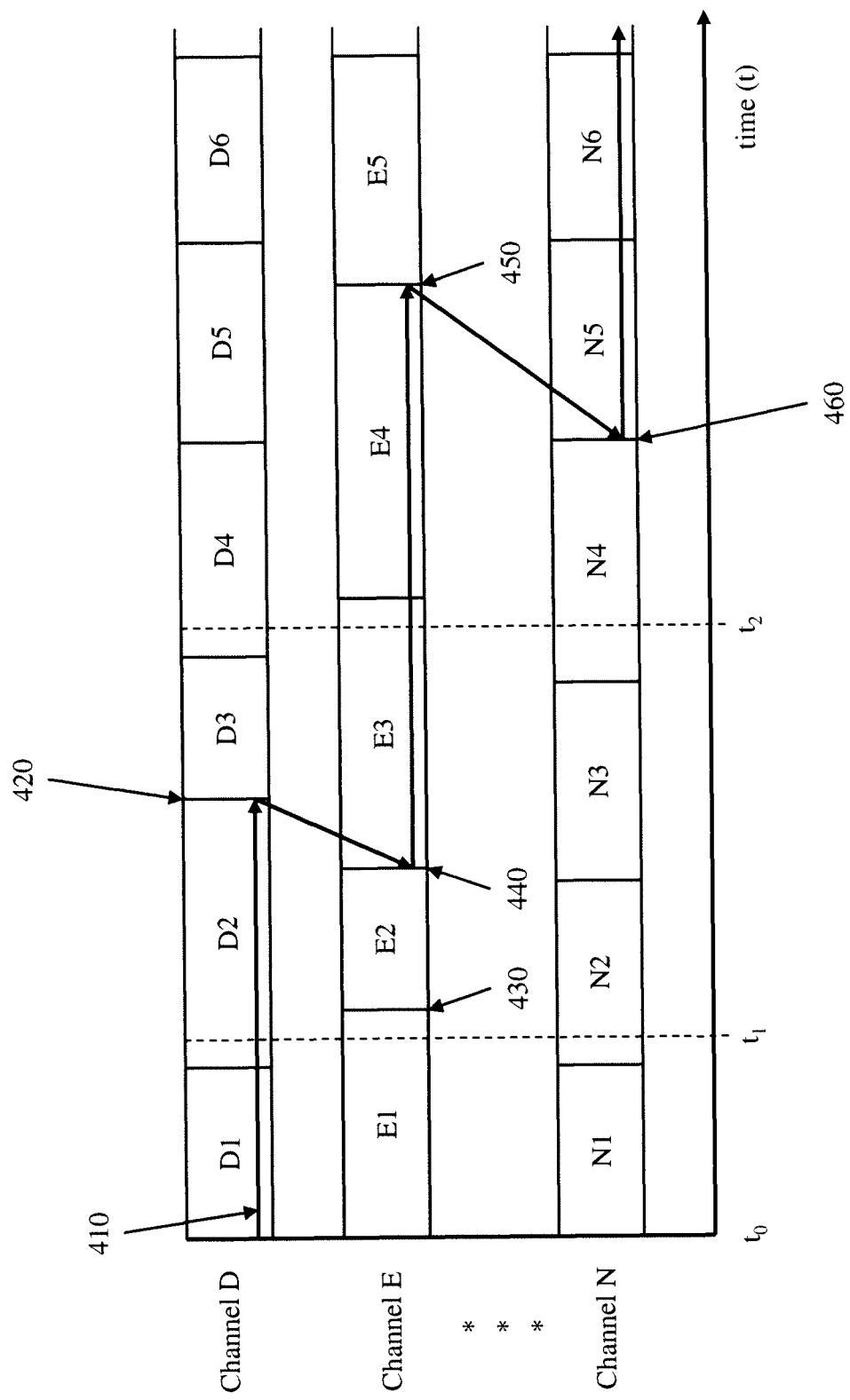
FIG. 4 illustrates an N-stream operation for an exemplary UMC system implementation according to certain embodiments.

FIG. 4 illustrates an N-stream operation for an exemplary UMC system implementation according to certain embodiments. As shown in FIG. 4, Channel D, Channel E and Channel N (i.e., N possible input channels) are each comprised of multiple segments: D1-D6, E1-E5 and N1-N6, respectively. At time $t_0$, the active input channel 410 is Channel D. At time $t_1$, a user initiates a UMC event to Channel E while being presented segment D2 from Channel D. As previously discussed in relation to FIGS. 2A-2C, the system waits for the next BOS for the target input channel, Channel E, which in this example is the BOS for segment E2 430. Once the BOS for E2 430 is found and segment E2 has begun being buffered in the secondary buffer, the system waits for the EOS of active segment D2 420. However, in this example, the EOS of the next target segment E2 440 is reached before the EOS of the current active segment D2 420 is reached. Thus, segment E2 is purged from the secondary buffer and new target segment E3 is buffered beginning at its BOS 440. When the EOS of active segment D2 420 is reached, Channel E is made the active input channel and the system presents segment E3, beginning at its BOS 440, as the new active segment from the new active input Channel E.

At time $t_2$, a user initiates a UMC event to Channel N while playing active segment E3 from the current active input channel, Channel E. Like before, the system waits for the next BOS for the target input channel, Channel N, which in this example is the BOS for segment N5 460. Note that during the wait for the BOS for the next target segment, the active input channel completed the active segment that was being presented when the UMC event happened, segment E3, and started on a new active segment, E4. Once the BOS for N5 460 is found and segment N5 has begun being buffered in the secondary buffer, the system waits for the EOS of the current active segment E4 450. When the EOS of the current active segment E4 450 is reached, Channel N is made the active input channel and the system presents segment N5, beginning at its BOS 460, as the new active segment from the new active input Channel N.

As a further example of certain embodiments, consider a user who is listening to a streamed source of music or audio content such as a news program. The source of this content may be from the Internet, a music server, satellite radio or other audio data stream. The user decides to change channels and listen to something on a different station. However the user prefers to finish listening to the remainder of the current song or news program before having the channel change. By using the UMC feature of certain embodiments described above, when the currently playing audio content reaches its end, the user would hear the next audio content on the new channel starting from its beginning. Normally, when a user changes between two audio channels, the new content would abruptly interrupt the active content and the user would two partial segments. The use of UMC may also be applied to video content. Again, a viewer can select an alternate video channel, but the current program will first play to completion. Subsequently, the program on the alternate channel will play from its beginning. This allows a UMC user to create a playlist out of media content that is being presented, because all segments sent to the output channel are presented in their entirety.

Although the application has been particularly described with reference to embodiments thereof, it should be readily apparent to those of ordinary skill in the art that various changes, modifications, substitutes and deletions are intended within the form and details thereof, without departing from the spirit and scope of the application. Accordingly, it will be appreciated that in numerous instances some features of certain embodiments will be employed without a corresponding use of other features. Further, those skilled in the art will understand that variations can be made in the number and arrangement of inventive elements illustrated and described in the above figures. It is intended that the scope of the appended claims include such changes and modifications.

What is claimed is:

1. A method of outputting content, said method comprising:
   outputting a first content segment using an output channel of an electronic device, wherein said first content segment is accessed from a first channel of said electronic device and buffered using a first buffer of a plurality of buffers;
   accessing, at said electronic device, a request from a user to switch from said first channel to a second channel of said electronic device;
   changing, responsive to said request, a state of a component of said electronic device to implement said switch from said first channel to said second channel; and
   outputting a second content segment using said output channel of said electronic device, wherein said second content segment is accessed from said second channel of said electronic device and buffered using a second buffer of said plurality of buffers, and wherein said outputting said second content segment further comprises outputting said second content segment from a beginning of said second content segment, and
   wherein said outputting said first content segment further comprises outputting said first content segment contemporaneously with a buffering of said second content segment.

2. The method of claim 1, wherein said outputting said second content segment further comprises outputting said second content segment responsive to outputting said first content segment in its entirety.

3. The method of claim 1 further comprising:
   responsive to said accessing said request, determining a beginning of said second content segment;
   responsive to said determining said beginning of said second content segment, determining an end of said first content segment; and
   wherein said outputting said second content segment further comprises outputting said second content segment responsive to said determining said end of said first content segment.

4. The method of claim 1 further comprising:
   responsive to said request to switch from said first channel to said second channel, storing a portion of said second content segment into a buffer of said plurality of buffers; and
   wherein said outputting said second content segment further comprises outputting said portion of said second content segment stored in said buffer.

5. The method of claim 4 further comprising:
   purging said buffer after output of said second content segment is complete.

6. The method of claim 1 further comprising:
   responsive to said accessing said request, making said second channel an active channel;
   setting an active input flag to indicate said outputting of said first content segment;
   setting a target input flag to indicate said accessing of said request to switch from said first channel to said second channel; and
   resetting said target input flag to indicate said making said second channel an active channel.

7. The method of claim 1 further comprising:
   decoding said first content segment before output thereof; and
   decoding said second content segment before output thereof.

8. The method of claim 1, wherein said first and second channels are each media data streams and each comprise a respective plurality of content segments.

9. An electronic device comprising:
   a first channel;
   a second channel;
   an output channel; and
   a control component operable to:
      output a first content segment on said output channel, wherein said first content segment is accessed from said first channel and buffered using a first buffer of a plurality of buffers;
      access a request from a user to switch from said first channel to a second channel;
      change, responsive to said request, a state of a component of said electronic device to implement said switch from said first channel to said second channel; and
      output a second content segment on said output channel, wherein said second content segment is accessed from said second channel and buffered using a second buffer of said plurality of buffers, and wherein said controller is further operable to output said second content segment from a beginning of said second content segment, and
      wherein said control component is further operable to output said first content segment contemporaneously with a buffering of said second content segment.

10. The electronic device of claim 9 further comprising:
    said component operable to selectively couple said first and second channels to said output channel, and wherein said component is controlled by said control component.

11. The electronic device of claim 9, wherein said control component is further operable to output said second content segment responsive to outputting said first content segment in its entirety.

12. The electronic device of claim 9, wherein said control component is further operable to:
    responsive to accessing said request, determine a beginning of said second content segment;

responsive to determining said beginning of said second content segment, determine an end of said first content segment; and wherein said control component is further operable to output said second content segment responsive to determining said end of said first content segment.

13. The electronic device of claim 9, wherein said control component is further operable to store a portion of said second content segment into a buffer of said plurality of buffers responsive to said request to switch from said first channel to said second channel, and wherein said control component is further operable to output said portion of said second content segment stored in said buffer.

14. The electronic device of claim 13, wherein said control component is further operable to purge said buffer after output of said second content segment is complete.

15. The electronic device of claim 9, wherein said control component is further operable to:
make said second channel an active channel responsive to accessing said request;
set an active input flag to indicate output of said first content segment;
set a target input flag to indicate access of said request to switch from said first channel to said second channel; and
reset said target input flag to indicate making said second channel an active channel.

16. The electronic device of claim 9 further comprising:
a decoding component coupled to said output channel, wherein said decoding component is operable to decode said first content segment before output thereof, and wherein said decoding component is further operable to decode said second content segment before output thereof.

17. The electronic device of claim 9, wherein said first and second channels are each media data streams and each comprise a respective plurality of content segments.

18. An electronic device comprising:
means for outputting a first content segment using an output channel of an electronic device, wherein said first content segment is accessed from a first channel of said electronic device and buffered using a first buffer of a plurality of buffers;
means for accessing a request from a user to switch from said first channel to a second channel of said electronic device;
means for changing, responsive to said request, a state of a component of said electronic device to implement said switch from said first channel to said second channel; and
means for outputting a second content segment using said output channel of said electronic device, wherein said second content segment is accessed from said second channel of said electronic device and buffered using a second buffer of said plurality of buffers, and wherein said means for outputting said second content segment further comprises means for outputting said second content segment from a beginning of said second content segment, and wherein said means for outputting said first content segment further comprises means for outputting said first content segment contemporaneously with a buffering of said second content segment.

19. The electronic device of claim 18, wherein said means for outputting said second content segment is further operable to output said second content segment responsive to outputting said first content segment in its entirety.

20. The electronic device of claim 18 further comprising:
means for determining, responsive to said accessing said request, a beginning of said second content segment;
means for determining, responsive to said determining said beginning of said second content segment, an end of said first content segment; and
wherein said means for outputting said second content segment is further operable to output said second content segment responsive to determining said end of said first content segment.

21. The electronic device of claim 18 further comprising:
means for storing, responsive to said request to switch from said first channel to said second channel, a portion of said second content segment into a buffer of said plurality of buffers; and
wherein said means for outputting said second content segment is further operable to output said portion of said second content segment stored in said buffer.

22. The electronic device of claim 21 further comprising:
means for purging said buffer after output of said second content segment is complete.

23. The electronic device of claim 18 further comprising:
means for making, responsive to said accessing said request, said second channel an active channel;
means for setting an active input flag to indicate output of said first content segment;
means for setting a target input flag to indicate access of said request to switch from said first channel to said second channel; and
means for resetting said target input flag to indicate making said second channel an active channel.

24. The electronic device of claim 18 further comprising:
means for decoding said first content segment before output thereof; and
means for decoding said second content segment before output thereof.

25. The electronic device of claim 18, wherein said first and second channels are each media data streams and each comprise a respective plurality of content segments.

* * * * *